United States Patent [19]

Hess

[11] 3,718,249
[45] Feb. 27, 1973

[54] CAROUSEL FOR BAGGAGE AND OTHER ARTICLES

[75] Inventor: Gildard H. Hess, San Leandro, Calif.

[73] Assignee: Stanray Corporation, Chicago, Ill.

[22] Filed: April 12, 1971

[21] Appl. No.: 133,220

[52] U.S. Cl. ............................... 198/181, 198/203
[51] Int. Cl. ......................... B65g 15/00, B65g 23/00
[58] Field of Search.............. 198/181, 182, 209, 203; 248/345.1

[56] References Cited

UNITED STATES PATENTS

| | | | |
|---|---|---|---|
| 3,361,249 | 1/1968 | Cadman | 198/209 |
| 3,493,097 | 2/1970 | Karr | 198/181 |
| 2,885,821 | 5/1959 | Frick | 248/345.1 |
| 3,180,483 | 4/1965 | Johnson | 198/209 |

Primary Examiner—Richard E. Aegerter
Attorney—Milmore & Cypher

[57] ABSTRACT

A conveyor of the carousel type for baggage and other articles consisting of a continuous chain having elongated links supported on self aligning caster wheels the chain assuming a pre-designed shape by means of guide wheels mounted on the links in contact with guide rails. Drive means operably engaging and propelling the chain the pallets carrying an endless rubber bumper at the lower end of the pallets to provide a continuous circumferential bumper stop for the luggage. The stainless steel plates carried by the pallets being connected thereto by spring mounted means.

3 Claims, 12 Drawing Figures

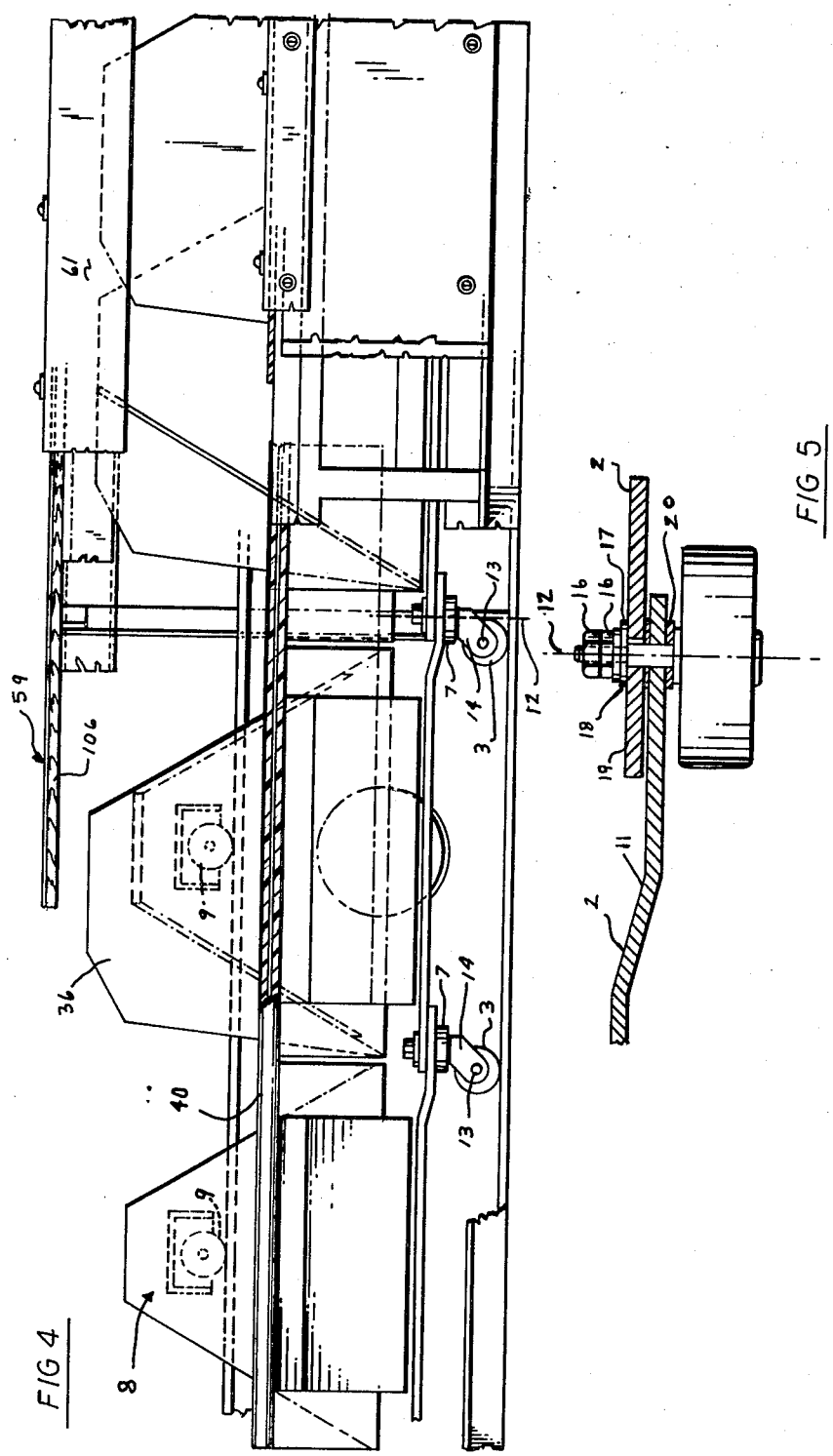

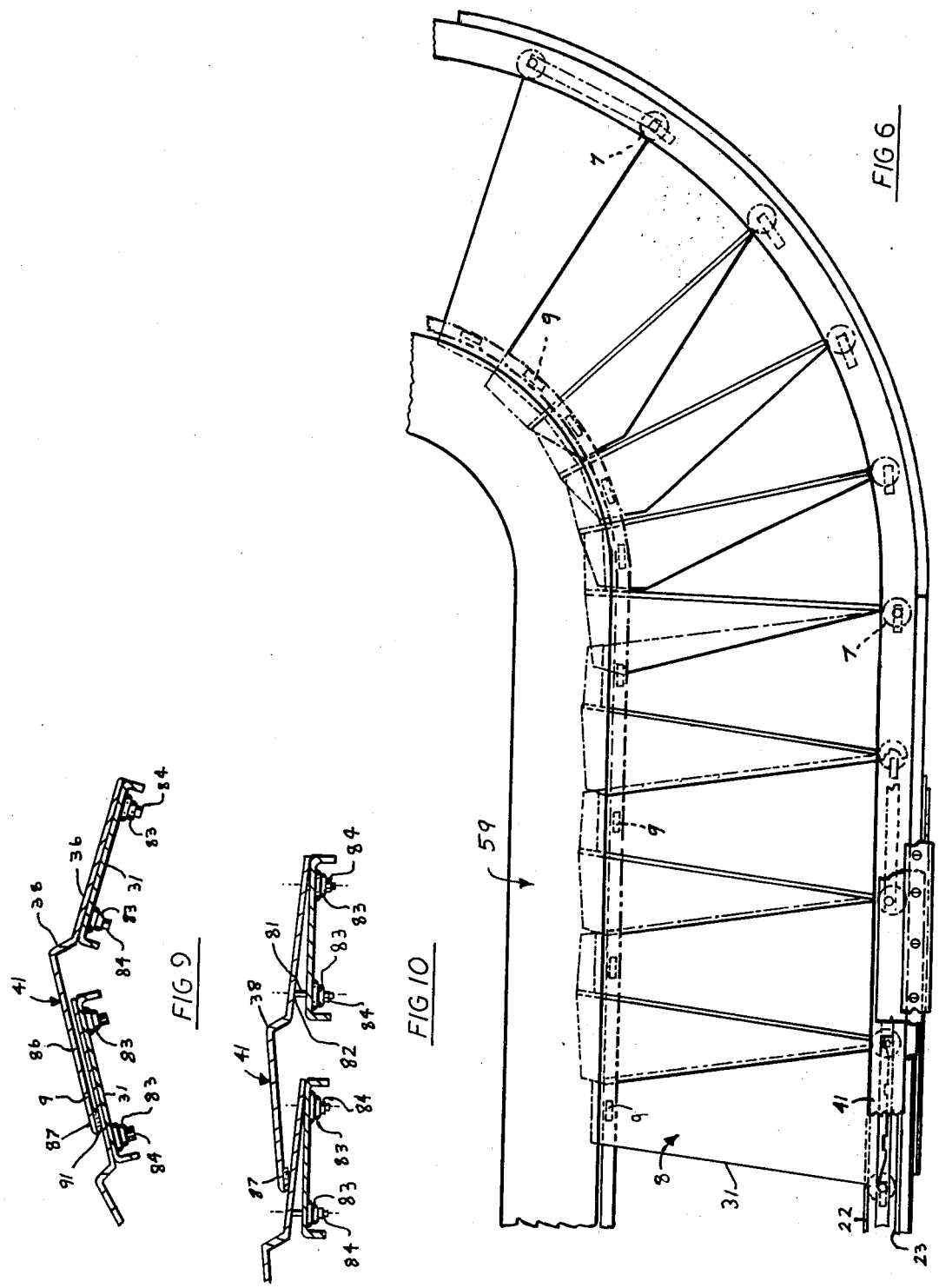

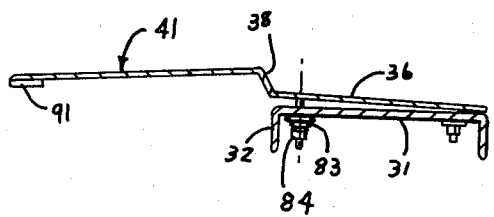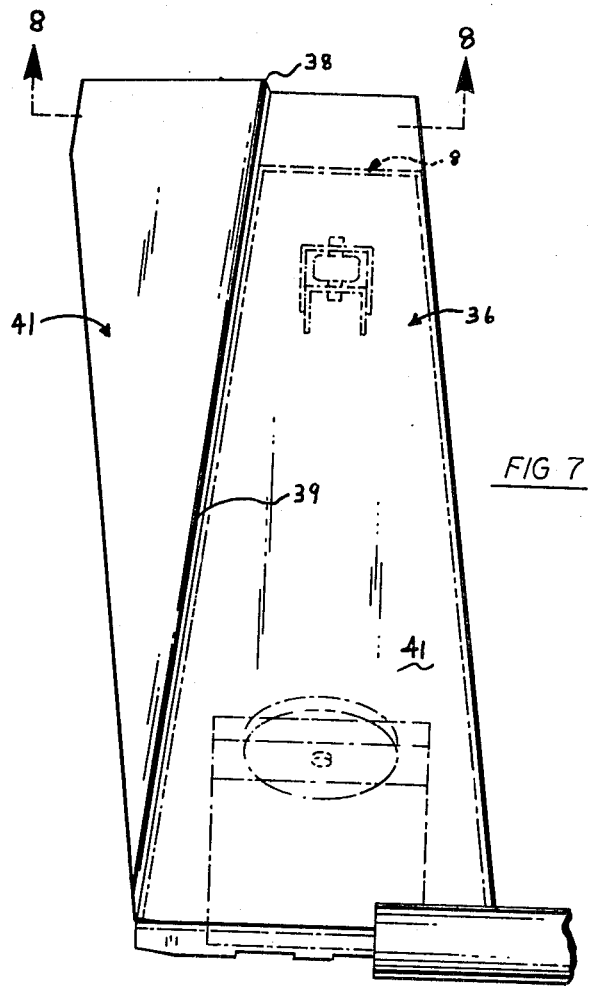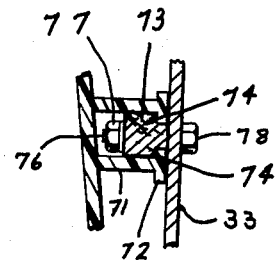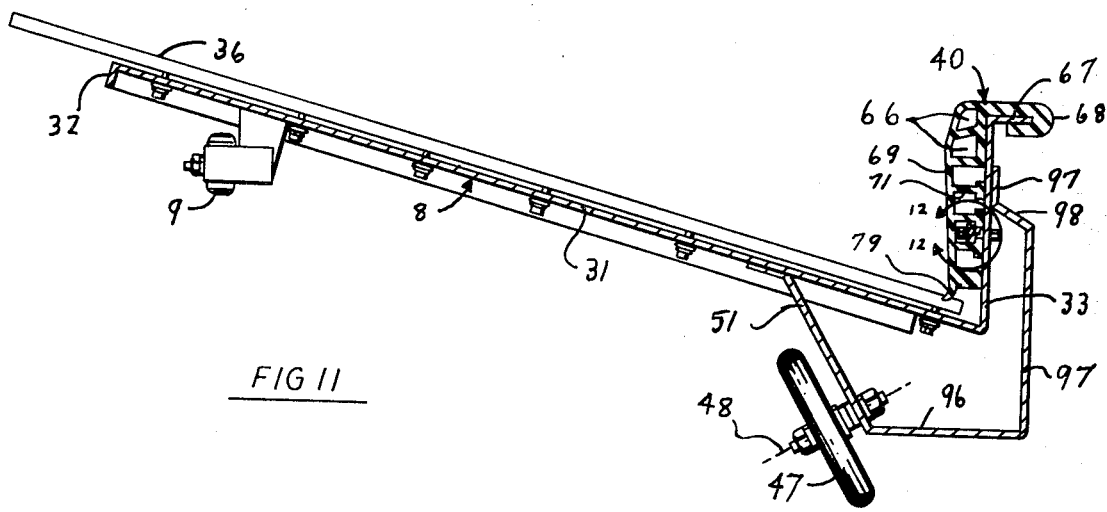

CAROUSEL FOR BAGGAGE AND OTHER ARTICLES

BACKGROUND OF THE INVENTION

This invention relates to devices for receiving and circulating baggage and other articles at multiple discharge stations. It is particularly adapted for large transportation terminals where a large number of hand carried objects must be quickly dispersed to an equally large number of persons in a short period of time and within a limited floor area.

This invention is an improvement on carousels of the type described in U.S. Pat. application Ser. No. 837,542 and U.S. Pat. application Ser. No. 877,283.

SUMMARY OF THE INVENTION

The gist of the invention is the use of a continuous chain with elongated links supported on caster wheels which track to any configuration the chain is designed to assume. Placement of the casters and guide wheels at critical points on the chain insures smooth operation with a minimum of wear on the load supporting wheels.

An object of the present invention is to couple the pallets, chain and self aligning casters so that a continuous rubber bumper can be used which travels with the pallets to obviate tumbling of baggage caused by contact with stationary bumpers or pinching of baggage between the interleaving mechanism of individual traveling bumpers.

Another object of the invention is to provide a carousel which can be constructed in any configuration so long as the turns are convex; the unit can be expanded after initial installation and the conveyor can be constructed with greater lengths than heretofore possible.

Another object of the invention is to provide a system which can be constructed from relatively few rugged parts so that it will perform reliably over a longer period of time between major overhauls and without failure of any major parts.

Still another object is to reduce wear of the stainless steel baggage carrying plates and to insure a relatively flat, continuous surface at turns of various radii.

BRIEF DESCRIPTION OF THE DRAWINGS

FIG. 4 is an enlarged side view of a portion of the invention with portions removed to show in detail the relation of the continuous chain, the load carrying wheels, the guide wheels and the carrier members.

FIG. 5 is an enlarged cross sectional view of the connection between the chain links.

FIG. 6 is a plan view of a typical curve in the conveyor unit showing the relationship of the carrier leaves to one another and to their carrier means.

FIG. 7 is an enlarged plan view of one of the stainless steel plates showing the formation of the spring.

FIG. 8 is a cross section of a plate taken on line 8—8 of FIG. 7.

FIG. 9 is a cross section of the two plates showing their relationship in a turn.

FIG. 10 is a cross section of two plates showing their relationship in a straight section of the system.

FIG. 11 is a cross section of one of the pallets and bumper.

FIG. 12 is an enlarged cross section of a portion of the bumper taken in the area 12—12 of FIG. 11.

DESCRIPTION OF THE PREFERRED EMBODIMENTS

Figure 1:
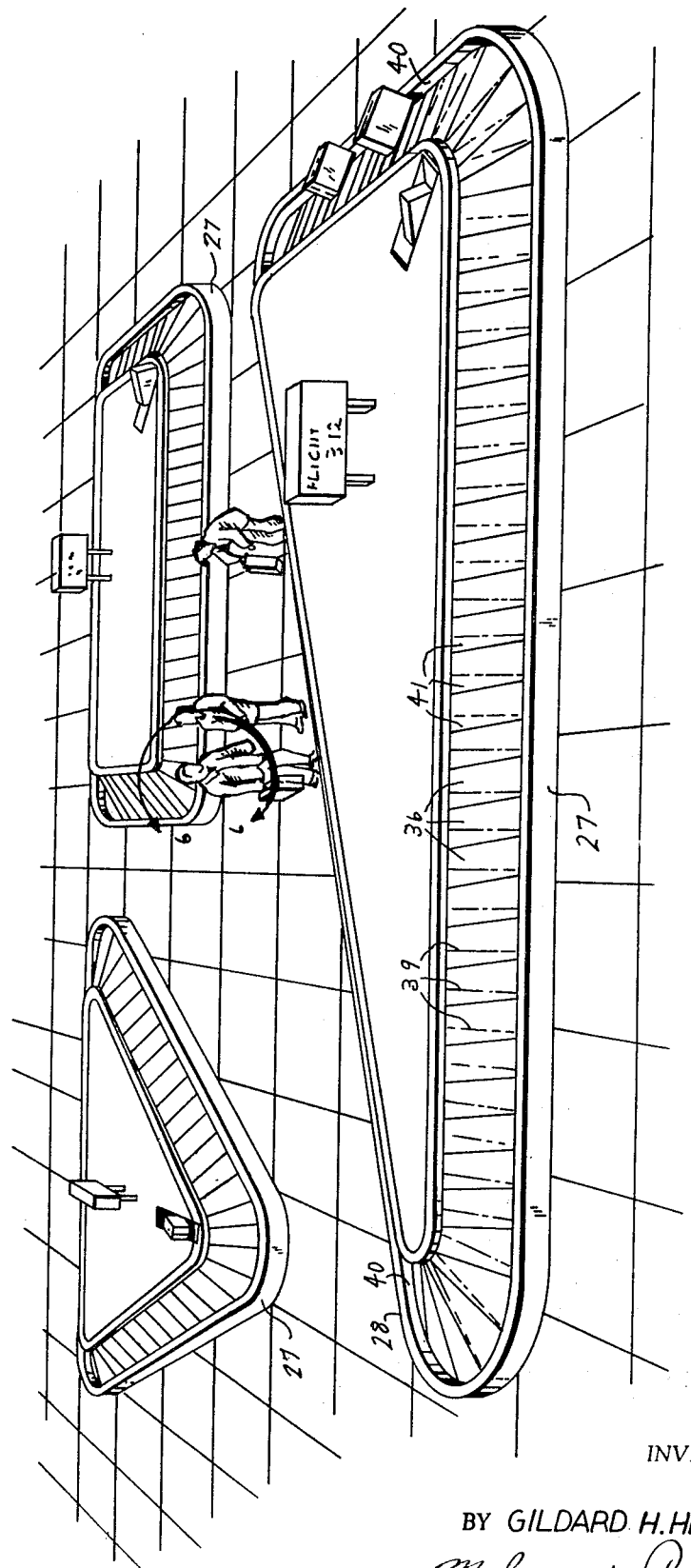
FIG. 1 is a perspective view of a carousel system showing several of many different configurations each conveyor unit can assume.

The carousel of the present invention consists briefly of a continuous chain mounted in a plane having elongated links 2; caster wheels 3 connected to the links for supporting the chain; guide rail means defining the configuration of the chain; guide wheels 7 mounted on the chain in rolling contact with the guide rail means; a pallet carrier having a base 8 mounted on the chain links and having a load carrier wheel 9 mounted thereon spaced from the caster wheel; drive means; and drive engaging means operably connecting the drive means and chain for propelling the carousel.

Each link in the chain consists of a metal bar having a length sufficient to receive one carrier and to span the distance between caster supports. Each link at its leading end may be formed with a bend 11 as shown in FIG. 5. Each of the vertical axes of the casters and the axes of the horizontally mounted guide wheels are preferably mounted on a common axis 12 at the pivotal connection of each of the chain links. This arrangement eliminates costly initial alignment and adjustments in aligning the guide wheels load wheels and connections between links. As shown in FIGS. 4 and 5 the caster wheels are rotatably mounted on axles 13 journaled in trailing arms 14 which are freely pivotal about the previously mentioned vertical axis. The tires of the casters preferably are polyurethane to insure long wear. Each caster has a vertical stub axle on which is freely rotatably mounted a guide wheel. A leading and a trailing link is pivotally mounted on the axle and the assembly is secured by threading a pair of nuts 16 and 16' on a threaded end of the axle with a suitable lock washer 17 and washers 18, 19 and 20.

Figure 3:
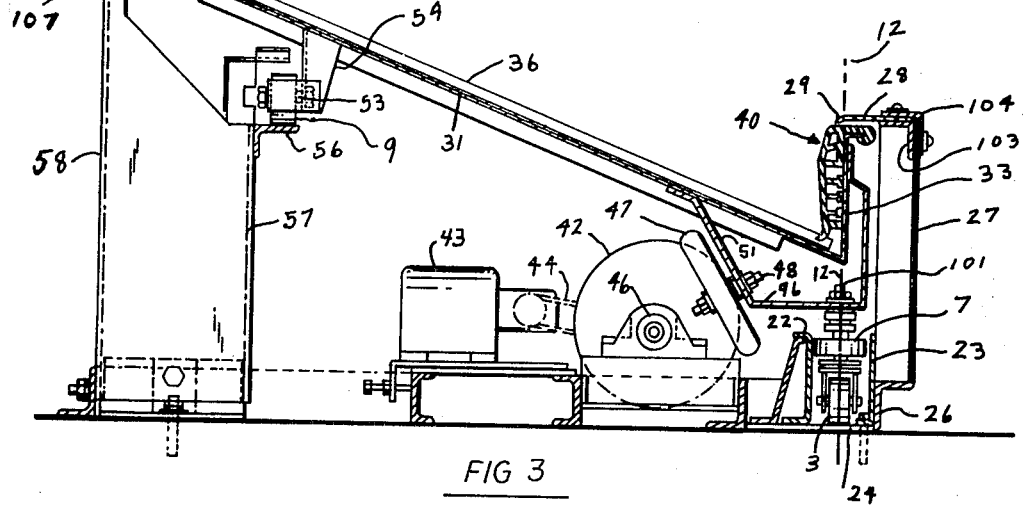
FIG. 3 is a cross sectional view of the invention taken substantially along the line 3—3 of FIG. 2.

The guide rail means may be any elongated support member which contacts the guide wheels. An inner rail 22 is essential but it has been found desirable to add an outer rail 23 along the straight track portions of the carousel. As shown in FIG. 3, the guide means includes a plate 24 which supports the load bearing wheels and angle 26 supports a metal guard sheet 27 and a rubber or plastic shield 28 having a lip 29 extending in close proximity to the carrying means.

The pallet carrier base consists of a trapezoidal sheet metal member 31 having flanged edges 32 for stiffness and an upturned vertical flange 33 at its lower end. Various size units can be employed.

Plate members, which are preferably stainless steel sheets 36, are attached to the carrier by fasteners such as Nelson stud welds. The shape of the carriers and the sheets are determined by the radius of the sharpest curve in the unit. As shown in FIG. 6 the slope of the sides of the carriers must be such that they just barely touch when traversing a bend. The stainless steel sheets are designed with their trailing edges approximately parallel to the leading edge of the carrier with slight overlapping thereof at the straight portions so that the stainless steel sheets will be supported at their trailing edges.

Since the stainless steel sheets necessarily slide over one another at the turns, it is essential to keep the overlapping edges in contact with the lower sheets at all times. This is accomplished by placing an off set bend 38 in each of the stainless sheets along a line 39 running the length of the sheet as shown in FIG. 7. As can be seen in the curved portion of the unit in FIG. 6, the "wiped" area does not overlap the spring bend. As shown in FIG. 7, the trailing portion 41 of the sheet is bent downwardly and with the operation of the short radius bend acting as a spring, the sheets stay in contact with one another.

A continuous rubber bumper 40 is attached to the flange at the lower end of the carrier and cushions the shock as the baggage slides down the inclined carrier surface. The bumper is more fully described below.

The drive means is a feed screw 42 with a 12 inch pitch, driven by an electric motor 43 through a speed reducer and chain drive 44 to the screw shaft 46. The horsepower of the motor and the reducer are determined by the length of the unit, the driven speed and the design loads. The screw of the present device turns at about 100 r.p.m. to give a conveyor speed of 100 feet per minute. A design loading of the present conveyor is 50 pounds per square foot. Speeds of 150 feet per minute are easily obtained.

The screw engages two or more drive engaging means (preferably 3) such as aluminum wheels 47 having polyurethane tires. The wheels are 8 inches in diameter and are freely rotably mounted on a shaft 48 journaled in an angle member 51 attached to the underside of the carrier and to a chain link. Light weight metal is used to cut down the flywheel action. In order that the wheel will be co-linear with the screw and is not constantly scuffing, the axis of the wheel is tilted as shown in FIG. 3 so that the axis of the wheel is at an angle with the axes of the load bearing wheels. Further, the axis of rotation of the wheel intersects the screw at a point off center of the axis of the screw.

The upper end of the carrier is supported by a load wheel which freely rotates on axis 53 journaled in bracket 54 which is attached to the underside of the carrier. The upper wheel is fitted with a polyurethane tire or other long lasting material and rides on rail 56 which is elevated above the lower wheel so that the carrier slopes to the outer rail. The rail is here supported on plate 57. A plate 58 supports an upper guard 59 which carries a flexible wiper 61 to prevent contact with the upper ends of the stainless steel sheets.

The unit must have a straight section when using the helical screw as a drive means which is at least the distance between at least two and preferably three driven wheels.

Referring to FIGS. 4, 7, 11 and 12, the bumper member 40 is constructed from a resilient material such as rubber and completely shields the metal flanges of each pallet carrier in a continuous strip which is coextensive in length with the chain. The bumper moves with the carriers and spans the distance therebetween so that even the smallest package will not slip between the carriers and become enmeshed in the mechanism. Since the bumper is movable rather than stationary, there is no possibility of the baggage or other articles being tumbled by catching between the moveable carriers and any stationary supporting structure.

As shown specifically in FIGS. 3 and 11, the bumper is formed with cavities 66 to decrease the weight and provide for greater ability to absorb impact of articles sliding down the stainless steel plates.

Flange 33 is formed with a horizontal lip 67 and the bumper extends over and around this lip as shown by curved portion 68. The main portion of the bumper is actually constructed of a relatively thin member 69 with protruding legs 71 and flanged feet 72. The bumper is attached to the metal flange by means of a shaped member 73 which extends between the legs 71 of the bumper and shoulders 74 hold the flanges of the bumper feet in close contact with the metal flange. A threaded bolt 76 extends through the shaped member and the metal flange and threaded nuts 77 and 78 hold the assembly in place. The bumper is located in line with the pivotal axis of the caster assembly and therefore there is very little stretching of the bumper or relative movement between the bumper and the carriers. The bumper tends to dampen out any noise in the carriers and to serve as a shock absorber therebetween for any relative movement. The bumper hence is an integral portion of the entire system rather than merely a bumper against which the baggage impacts. Note that the bumper extends the entire height of the flange and ends in a extension member 79 in contact with the carrier plates.

A major feature of the present invention is the method of attachment of the stainless steel plates to the base of the carrier. As earlier noted, the plates overlap one another and since the plates are formed with an offset bend 38, the free portions of the plates move toward and away from the base of the carrier as each plate moves around turns and proceeds to the straight portions. To prevent failure of the welds between the studs 81 and the carrier plates, at the point of the weld 82, the studs extend through an opening in the base and a spring 83 is placed around the stud and positioned between the base and a retainer nut 84 connected to the free end of the stud. The spring biases the plate towards the base at all times. FIG. 9 shows the carrier going around a turn. In this position, the overlapping portion 86 is substantially parallel to the base of the adjacent overlapped carrier and the springs are in a relatively uncompressed position. Note that the springs are not relaxed, but are still compressed sufficiently to continue to pull the plate toward the base to prevent separation of the plates one from another as at edge portion 87 as shown in FIG. 9.

As shown in FIG. 10, the plates are in their relative positions as they would appear in the straight portions of the system. Note that the springs are fully compressed, leaving some reserve for alignment, and a space has opened up between the base and the plates. Again, as may be seen in FIG. 10, there is no opening at edge 87 between the plates in the straight sections of the system.

As may be seen in FIGS. 9 and 10, the overlapping portions of the plate are not parallel to the portions covering the base but are bent at a slight angle. The angle is roughly equal to the angle made by adjoining carriers when in the tightest bend so that the overlapping portions are approximately parallel as shown in FIG. 9.

To prevent chaffing of the stainless steel plates at the point of overlap, a strip of rubber or other resilient material 91 may be placed therebetween. The strip also insures quiet operation of the system as the plates move around turns or as loads come upon the plates.

The use of a continuous bumper which is coextensive with the length of the chain and circumference of the system is made possible by the unique combination of the construction of the carrier pallets and the placement of the load carrying caster assemblies.

Figure 2:
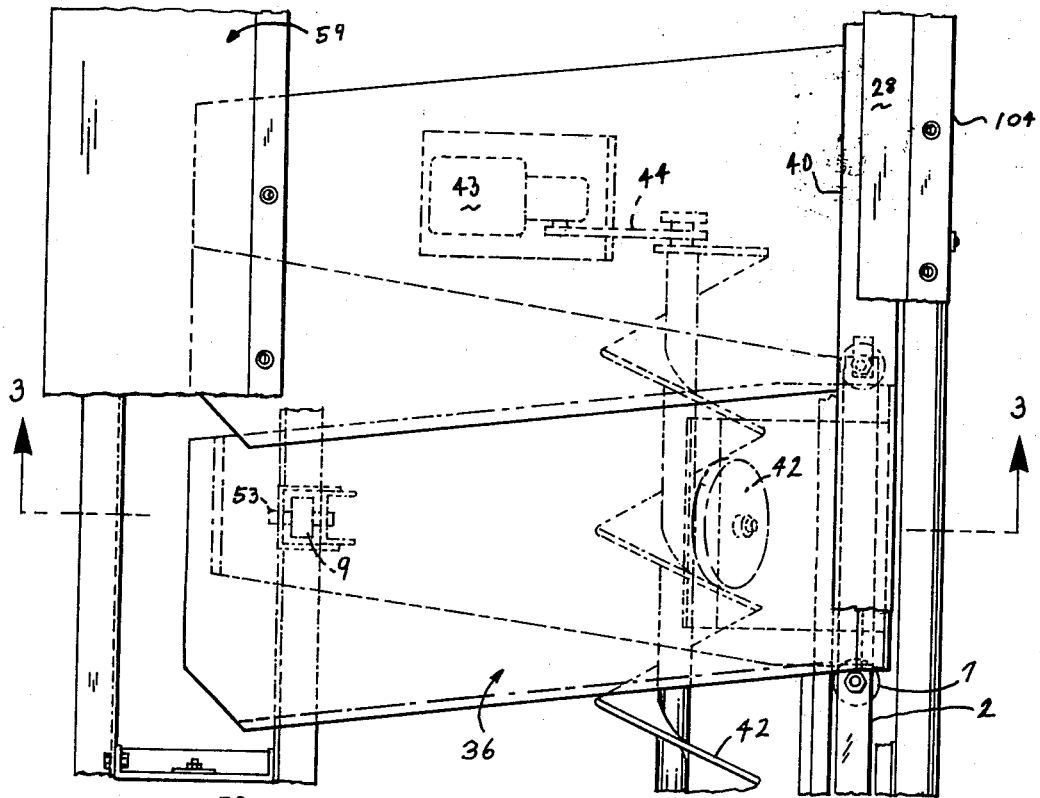
FIG. 2 is an enlarged plan view of a portion of the conveyor with portions removed to show in detail the guide rails and drive means.

Referring to FIG. 2, it may be seen that the casters are self aligning and track in the path created by the guide rails. A standard caster is used with the usual offset bracket.

Referring to FIG. 3, it may be seen that the flange 33 of the pallet carriers are in alignment with the vertical axis of the caster assembly. Thus, as the carriers swing around the turns in the system, there is a minimum of separation between the edges of adjacent carriers at the flange areas where the continuous rubber bumper is riding.

Referring to FIG. 11, the carrier pallet is constructed with angle member 51 being attached to the underside of the carrier base and extending outwardly and through the axis 12 by portion 96 and then is attached to the flange 33 by upright member 97 which angles inwardly at portion 98 and is attached at area 99 to the flange 33.

The caster assembly is attached to the carrier as shown in FIG. 3. The vertical axle 101 of the caster assembly which is located on axis 12, extends through portion 96 of the carrier angle assembly and is attached thereto by lock nuts 16 and 16′.

The construction of the guard rail surrounding the system is shown in FIGS. 2, 3, and 4. A pair of angles 103 and 104 connected to the upright member 27 hold the rubber shield 28 just above the top of the rubber bumper to prevent direct contact with the moving bumper.

The shield structure at the inner portion of the system is shown in FIG. 3 and consists of a horizontal member 106 which can be constructed from plywood and covered with a stainless steel member such as member 59. The member 106 is connected to the upright member 58 as by an angle 107. The flexible wiper 61 is connected to member 59 by an angle 108.

I claim:

1. A carousel for baggage and other articles comprising:
   a. a continuous chain mounted in a plane having elongated links;
   b. a guide rail means having substantially vertical flanges defining the configuration of said chain;
   c. a plurality of caster wheel assemblies each consisting of a substantially vertical stub axle connected to one of said links, self aligning load carrying caster wheels coaxially pivotable about the axis of said stub axle, and guide wheels rotatably mounted on said stub axle in rolling contact with said guide rail flanges;
   d. a plurality of pallet carriers mounted on said links consisting of a load carrying base positioned at an inclined angle and a substantially vertical flange at the extreme lower end of said base, a bracket connected to said load carrying base, and a second load carrying wheel mounted for rotation at the upper end of said pallet on an elevated track;
   e. said self aligning caster wheel, said stub axle and said vertical flange of each of said pallets being substantially in vertical alignment to insure negligible separation of said pallets in the plane of said vertical flanges;
   f. drive means including a helical screw member;
   g. a drive engaging wheel mounted on each of said pallet carriers for driven engagement by said screw member;
   h. a continuous flexible bumper member coextensive in length with said chain, connected to and substantially covering said pallet carrier flange and spanning the distance between said pallet carriers.
   i. sheet plate members mounted on each of said load carrying bases providing a surface overlapping said pallet carriers and adjacent plates for providing a continuous surface for receiving baggage and other articles;
   j. each of said sheet plate members carrying a resilient strip on its overlapping edge to prevent galling of the plate surfaces which come in overlapping rubbing contact; and
   k. resilient means connecting said plate members to said pallet carriers to permit limited relative movement in a direction normal to the plane of said pallet base members.

2. A carousel as described in claim 1 wherein;
   a. said plate members are made from metal and are formed with an offset along a line running the length of the sheet to form a bend line.

3. A carousel as described in claim 2 comprising:
   a. said resilient means comprising a rivet welded to said plate member and extending through an opening in said base of said pallet carrier, and a spring positioned between said pallet base and a retainer connected to the free end of said rivet and biasing said plate toward said pallet base.

* * * * *